Feb. 7, 1928.

J. A. WHEELER, JR., ET AL 1,658,506

HIDE AND LEATHER WORKING MACHINE

Filed July 26, 1926 6 Sheets-Sheet 1

Inventors.
John A. Wheeler, Jr.
Robert F. Whiting
by Ralph W. Foster, Att'y.

Feb. 7, 1928. 1,658,506
J. A. WHEELER, JR., ET AL
HIDE AND LEATHER WORKING MACHINE
Filed July 26, 1926 6 Sheets-Sheet 4

Inventors.
John A. Wheeler, Jr.
Robert F. Whitney
by Ralph W. Frost. Atty.

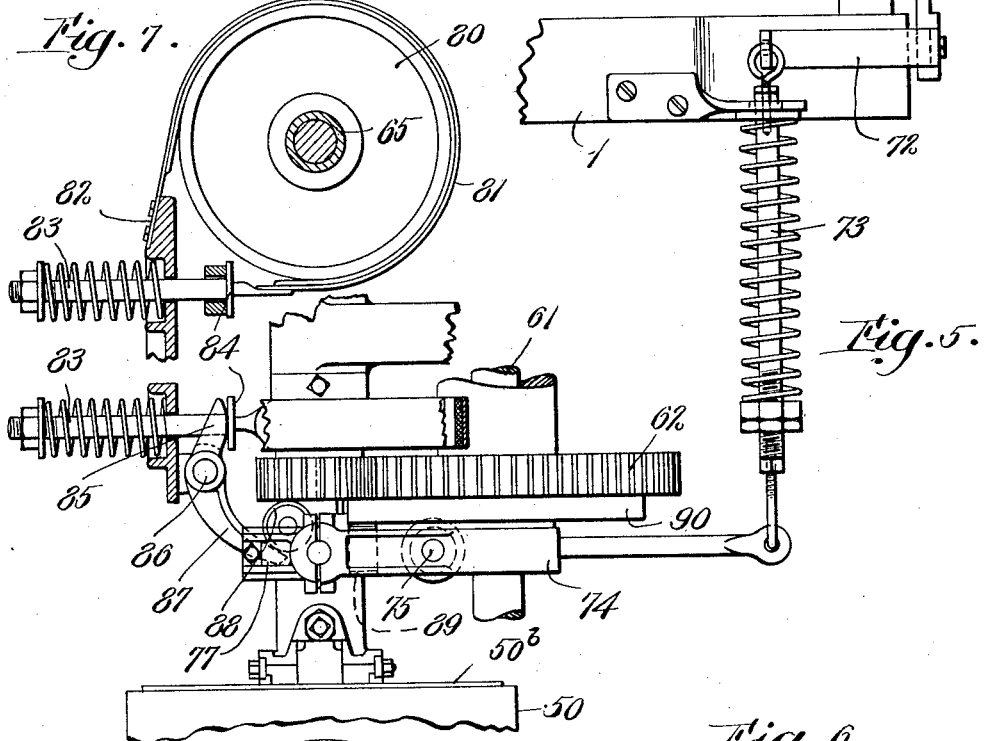
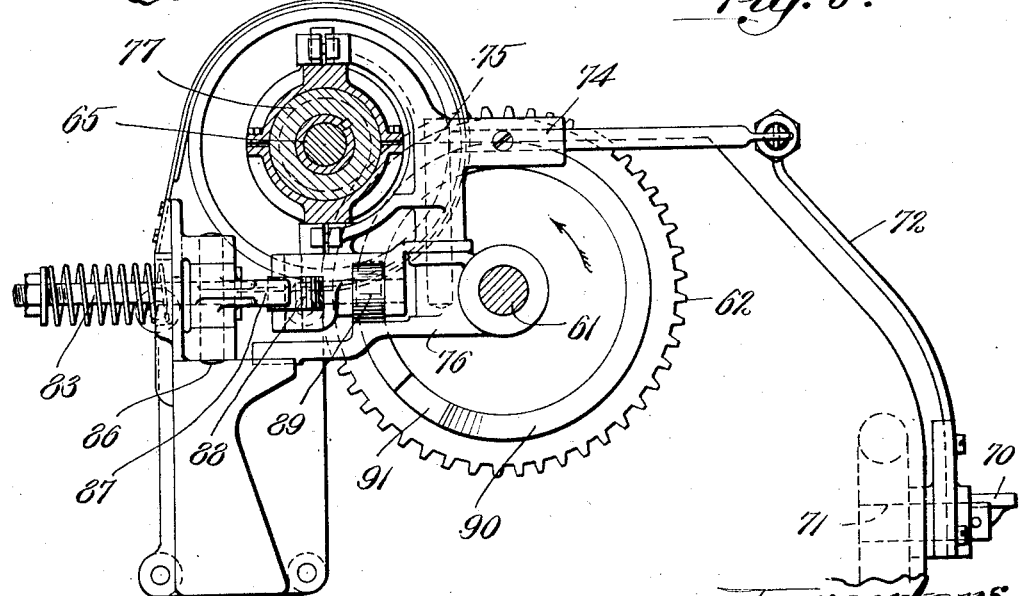

Feb. 7, 1928.
J. A. WHEELER, JR., ET AL
1,658,506
HIDE AND LEATHER WORKING MACHINE
Filed July 26, 1926  6 Sheets-Sheet 6
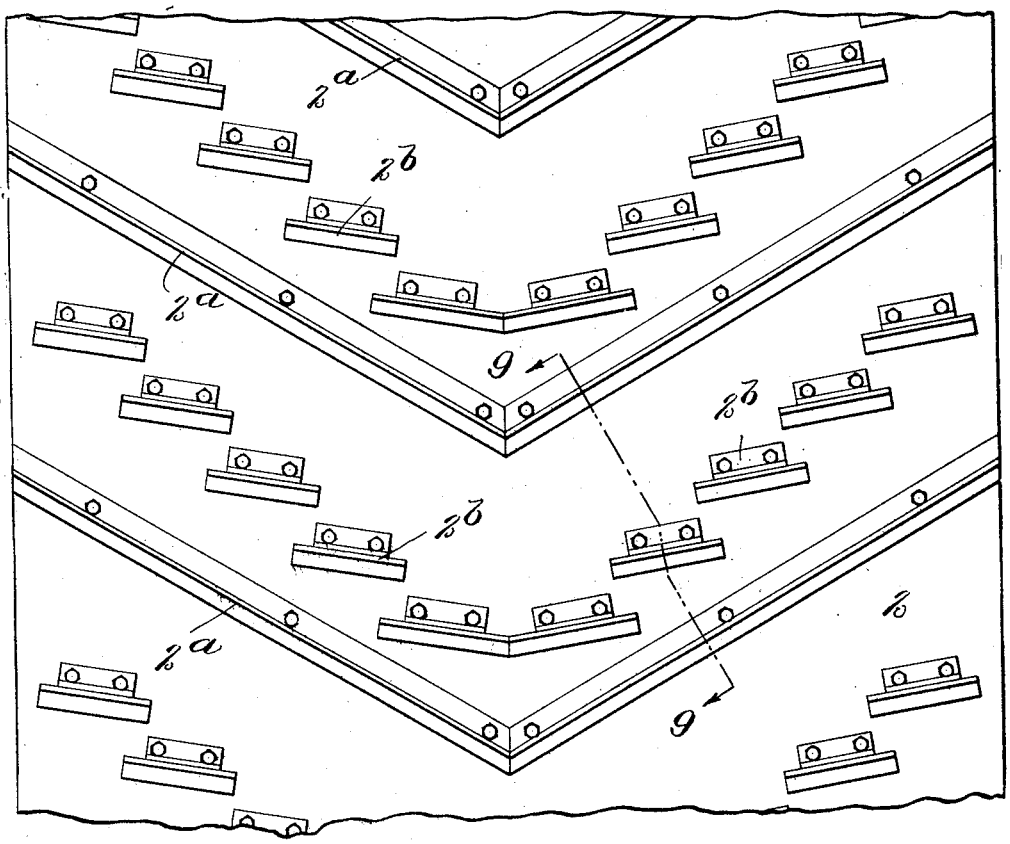
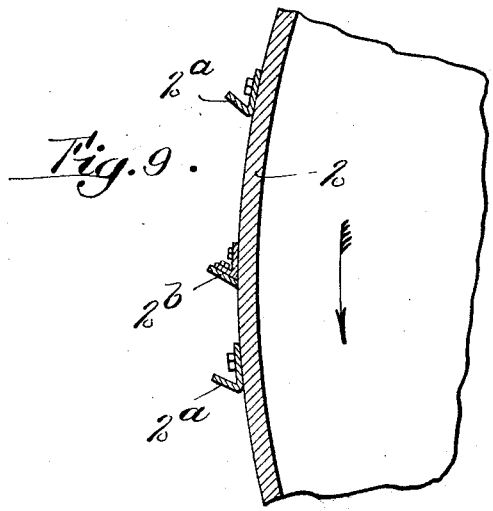
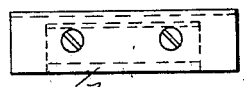
Inventors.
John A. Wheeler, Jr.
Robert F. Whitney
by Ralph W. Foster atty.

Patented Feb. 7, 1928.

1,658,506

UNITED STATES PATENT OFFICE.

JOHN A. WHEELER, JR., OF WEST MEDFORD, AND ROBERT F. WHITNEY, OF WINCHESTER, MASSACHUSETTS, ASSIGNORS TO WHITNEY MACHINE COMPANY, OF WINCHESTER, MASSACHUSETTS, A CORPORATION OF MASSACHUSETTS.

HIDE AND LEATHER WORKING MACHINE.

Application filed July 26, 1926. Serial No. 124,890.

This invention relates to hide and leather working machines and its object is to provide a machine adapted to work continuously and simultaneously upon more than half a hide or skin until the desired work is accomplished, without the necessity of shifting the position of the hide or skin during the operation; other objects being to provide for effectively supporting and holding the hide or skin while being operated on; to provide for properly spreading the hide or skin during the operation; and to provide a safety device for the protection of the operator.

The machine is adapted to unhair, fine hair and scud hides; put out and set leather; and to perform other similar work.

Figure 1:
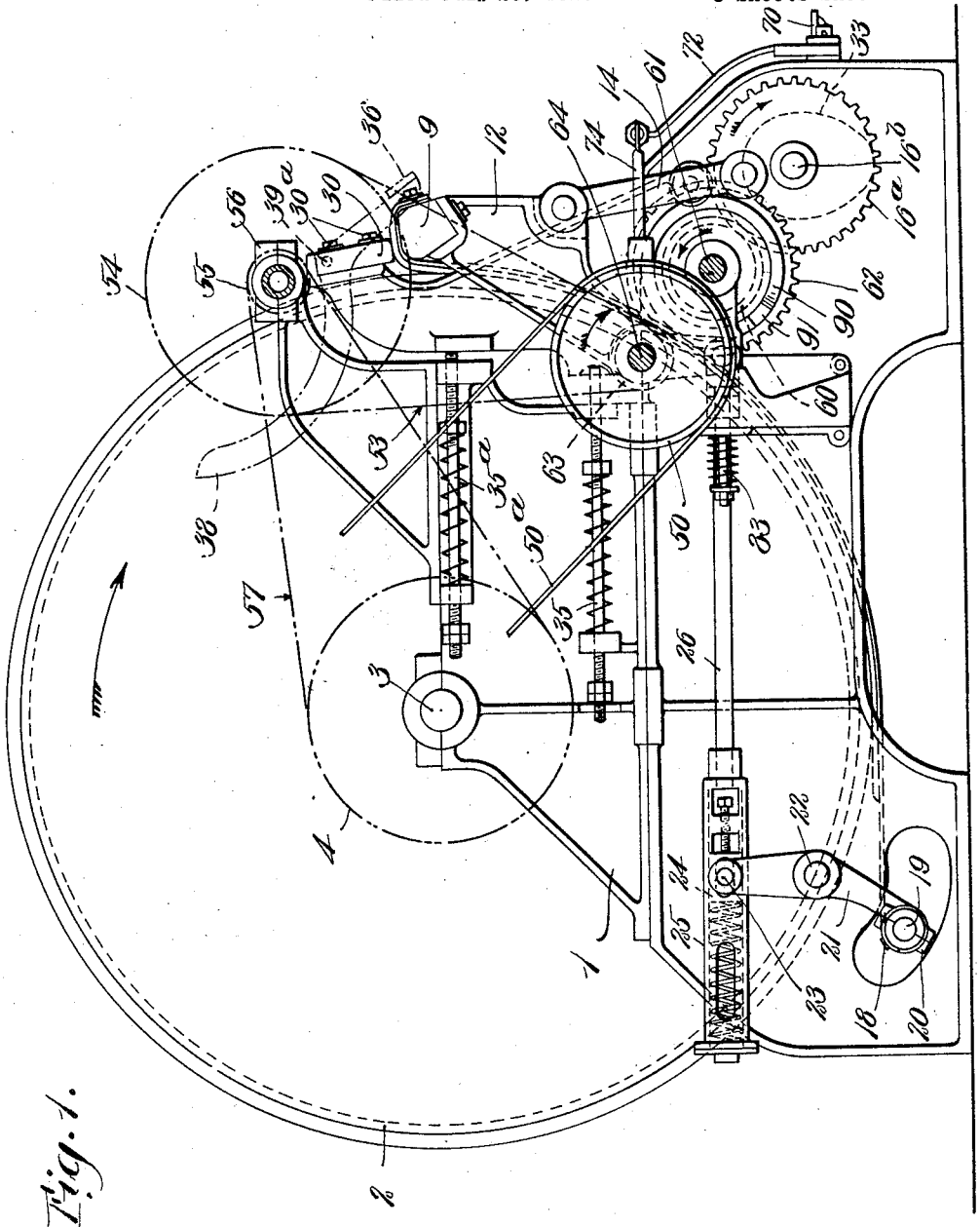
Figure 2:
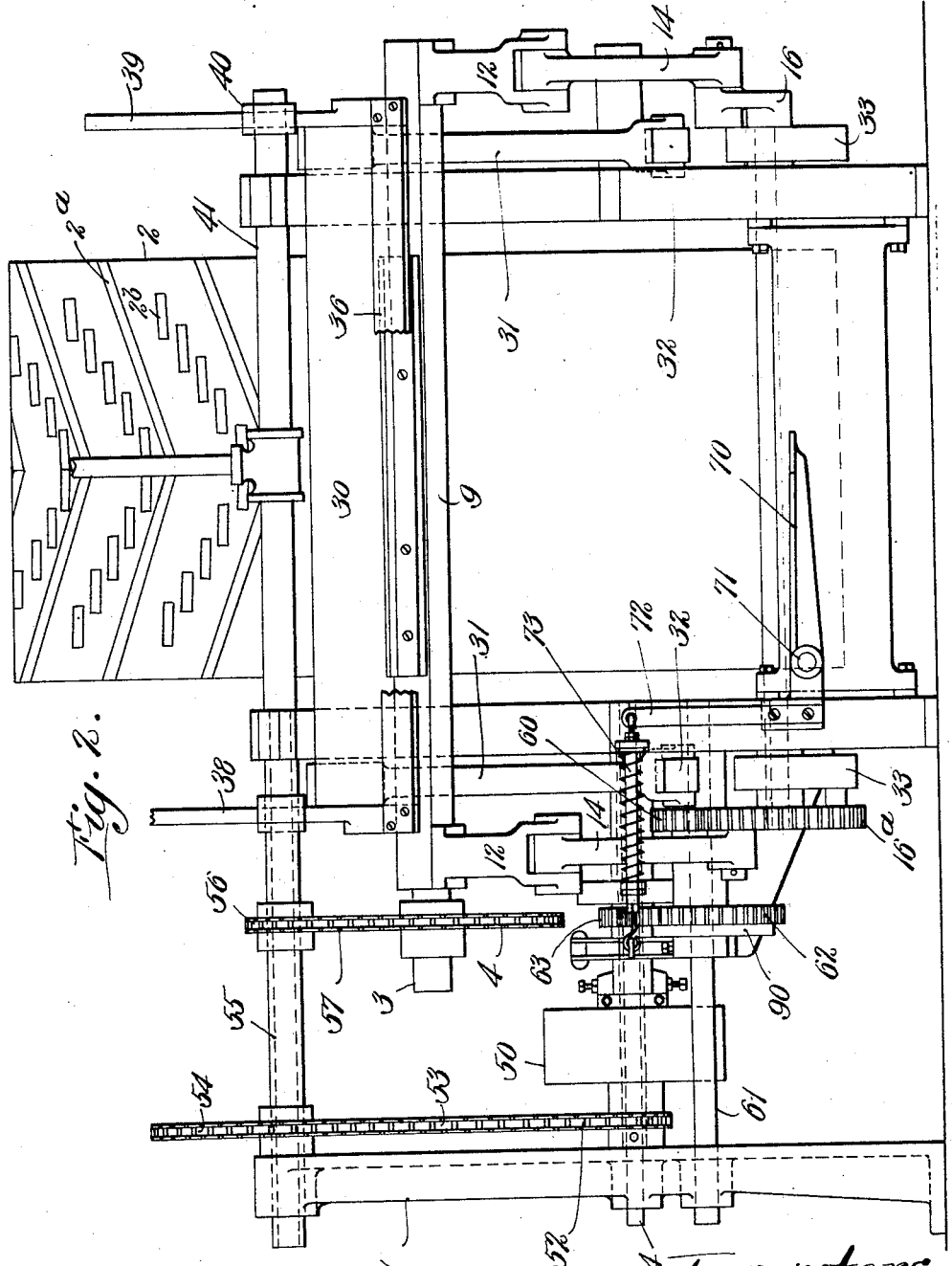
Figure 3:
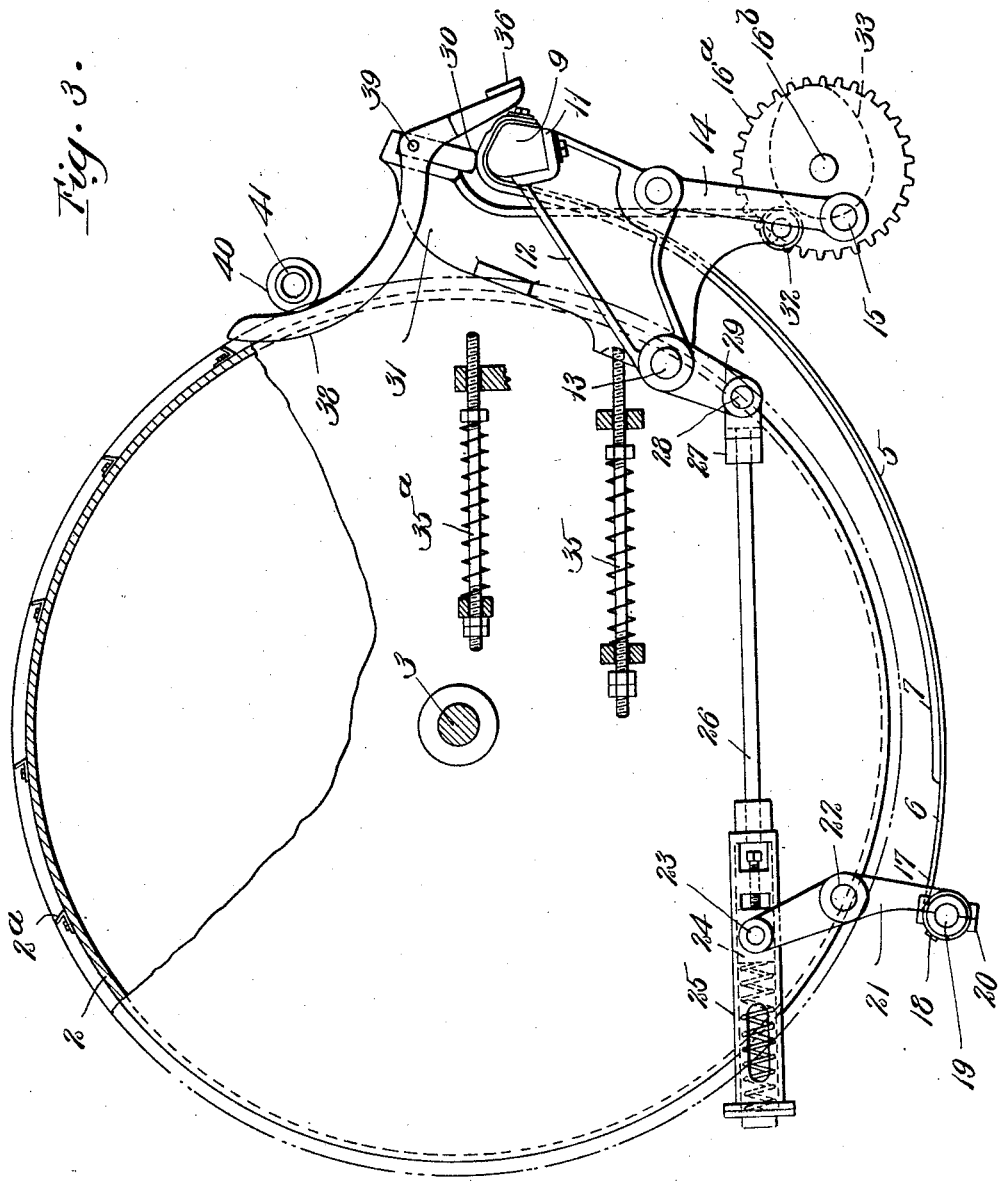
Figure 4:
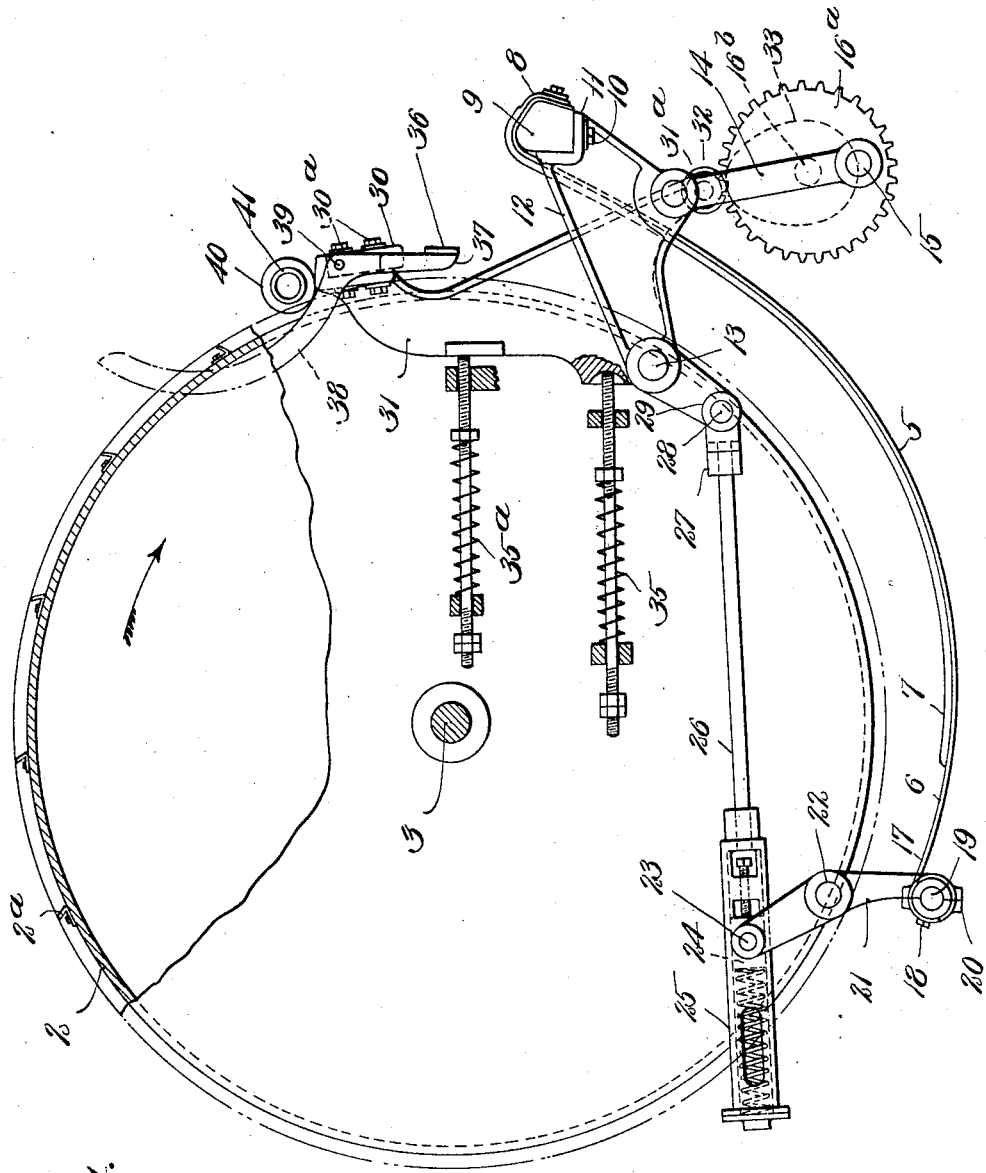

The invention is illustrated by the accompanying drawings in which: Figure 1 is a side elevation of the machine; Fig. 2 is a front elevation of the machine; Figs. 3 and 4 are side elevations of the machine showing different positions of the clamping members; Fig. 5 is a plan view of the clutch and brake mechanism; Fig. 6 is a side view partly in section of the clutch and brake mechanism; Fig. 7 is a side view partly in section of the brake; Fig. 8 is an elevation showing a portion of the surface of the drum with spreaders and scraping blades attached thereto; Fig. 9 is a cross section on the line 9—9, Fig. 8; Fig. 10 is a front view of a scraping blade; and Fig. 11 is an edge view of a scraping blade.

The various parts of the machine are mounted on the frame 1.

The drum, or work roll, 2, is preferably of sufficient diameter and breadth to workably engage more than half a hide or skin, is furnished with the spreading blades 2ª and the scraping blades 2ᵇ, and is mounted on shaft 3 journaled in the frame and carrying at one end sprocket wheel 4.

The flexible hide support 5, which is preferably of sufficient area to cover one quarter of the surface of the drum and which consists preferably of an underlayer of rubber belting 6 surmounted by a layer of rubber 7, is fastened at its upper end 8 to the lower clamping bar 9 horizontally disposed in front of the drum and parallel thereto, which clamping bar 9 is bolted at each end at 10 to the upper end 11 of the swinging arm 12 pivoted near its lower end at 13 to the frame and centrally connected by link 14 with the crank pin 15 of the cranks 16, 16ª, the latter being a gear, carried by the shaft 16ᵇ mounted on the frame.

The lower end 17 of the rubber belting 6 is fastened at 18 to the bar 19 horizontally disposed below and rearwardly of the vertical, central plane of the drum and parallel thereto, which bar 19 is mounted in the lower end 20 of levers 21 fulcrumed at 22 on the frame and having their upper end 23 journaled in spring controlled blocks 24 disposed in the rear end 25 of links 26, whose forward end 27 is pivoted at 28 to the lower end 29 of swinging arm 12.

The upper clamping bar 30, disposed parallel to the lower clamping bar 9, is bolted at 30ª to the upper end of rocker arms 31 pivoted centrally at 13 to the frame and furnished at their lower end with rollers 32 operatively engaged by cams 33 on shaft 16ᵇ.

The rocker arms 31 are engaged rearwardly by spring controlled rods 35 and 35ª mounted on the frame.

The safety device comprises a bar, or rail, 36, disposed between and parallel to the clamping bars 9 and 30 and fastened at each end to the lower end 37 of rocker arms 38 fulcrumed at 39 on the upper clamping bar and curved rearwardly and upwardly in engagement with guide rollers 40 mounted on the sprinkler pipe 41 mounted on the frame; which rollers serve to guide the rail downwardly and forwardly, as the clamping bars come together, and vice versa. As the rail moves downwardly and forwardly, the lower ends 37 of the rocker arms 38 become, rearwardly, operatively engaged by the clamping bar 9 (Figs. 1 and 3).

The drum 2 is driven continuously in one direction by the main pulley 50 (driven by belt 50ª) rotatively mounted on shaft 64, mounted on the frame, which carries sprocket 52 (Fig. 2) connected by sprocket chain 53 with sprocket 54 on sleeve 55, rotatively mounted on the frame, which sleeve carries also sprocket 56 connected by sprocket chain 57 with sprocket 4 on drum shaft 3.

The clamping bars 9 and 30 are reciprocated, respectively, by cranks 16, 16ª and cams 33 on shaft 16ᵇ, which crank 16ª is a gear engaged by gear 60 on shaft 61, mounted on the frame, which shaft 61 carries also gear 62 engaged by gear 63 on shaft 64, mounted on the frame, on which shaft 61 is keyed the driven member 50ᵇ (Fig. 5) of a clutch, whose driving member (pulley) 50 is rotatively mounted on said shaft.

The clutch, which is of the expanding, frictional type, is operated by the treadle 70 which is fulcrumed at 71 on the frame and has an arm 72 connected by the spring controlled link 73 with the swinging arm 74 which is pivoted at 75 to frame 76 (projected from the main frame), to which arm 74 is pivoted the collar 77 keyed to shaft 65 mounted on the frame.

The brake drum 80 is rotatively mounted on shaft 65 and is fixedly mounted on the hub of driven member 50ᵇ of the clutch; said brake drum being furnished with brake band 81 fastened at one end 82 to the frame and at the other end to the spring controlled rod 83 slidingly mounted on the frame and furnished with the flange 84 engaged by the inner end of rocker arm 85 pivoted at 86 to the frame and engaged at its outer end 87 by the roller 88 mounted in swinging arm 74.

The spring controlled roller 89, mounted on swinging arm 74, contacts with the annular cam 90 on gear 62 and is adapted to drop into the depression 91 in said annular cam, as said gear rotates, and stop its rotation.

The operation is as follows:

Normally (Fig. 4) the clamping bars are widely separated and the hide support is far removed from the drum, leaving ample space between them for the insertion of a hide or skin; the safety rail is raised up out of the way; the roller 89 is in the depression 91 in the annular cam 90; the brake band 81 is tight upon the brake drum 80; the clutch members are disengaged; and the drum is rotating, being driven by the main pulley.

The operator places a hide or skin over the lower clamping bar and flexible hide support and depresses the treadle, thereby raising the roller 89 out of the depression 91, loosening the brake band, engaging the clutch members, and actuating gear 62, which upon the completion of one rotation is again brought to rest by the roller being forced into the depression; the operator having removed his foot from the treadle.

The gears are so relatively proportioned that one rotation of gear 62 means but a one-half rotation of gear 16ᵃ, thereby providing for alternately bringing the bars together and separating them by the successive depressions of the treadle.

As the upper clamping bar (Fig. 4) descends, the safety rail swings downwardly and outwardly, thereby warning the operator, or actually pushing him away from the machine, as the bars come together; and, as the upper clamping bar ascends, the safety rail assumes its original position.

The action of the clamping bars and the flexible hide support, as controlled by cams 33 and cranks 16, 16ᵃ, and intermediate mechanism, is such that normally (Fig. 4) the clamping bars are most widely separated and the flexible side support farthest removed from the drum; the hide (not shown) is now placed in position on the lower clamping bar and flexible hide support and the treadle is depressed, thereby first bringing the clamping bars into engagement with the hide (Fig. 3) and subsequently bringing the flexible hide support into close contact with the drum (Fig. 1), thus providing for suitably positioning the hide preparatory to its being operated on; and the hide being thus held in close contact with the drum is simultaneously, as well as continuously and uniformly operated on throughout as long as may be desired.

The results thus obtained are superior both in quality and quantity to those obtainable from any other source.

The best results are obtained when the skin is placed on the flexible support with its backbone parallel and immediately adjacent to the clamping bars, as the operation then results in increasing the breadth of the skin, which proves most beneficial in subsequent operations and leaves a finished skin of better shape for cutting out shoe patterns.

This machine does the work of fine hairing and beaming, now performed by hand, and does it much better and five or six times as rapidly.

The word "drum", as employed in the claims, means a drum, or work roll, equipped with working blades, as illustrated in the drawings, or otherwise equipped for the particular work to be done.

We claim—

1. A hide and leather working machine comprising a frame and mounted thereon, in combination: a rotary bladed drum; rocker arms pivoted to the frame; swinging arms pivoted to the frame; a shaft journaled in the frame parallel to the axis of the drum; cams disposed on said shaft and operatively engaging said rocker arms; cranks disposed on said shaft; links connecting said cranks with said swinging arms; co-acting clamping bars disposed in front of the drum and parallel to the axis thereof, the upper clamping bar being mounted on said rocker arms and the lower clamping bar being mounted on said swinging arms; rearwardly disposed levers pivoted to the frame; links connecting said levers with said rocker arms; a rearwardly disposed bar mounted on said levers parallel to the axis of the drum; a flexible hide and leather support attached at its upper end to said lower clamping bar and at its lower end to said rearwardly disposed bar; means for rotating the drums; means for rotating the shaft carrying said cams and cranks; and means for automatically stopping said last mentioned shaft at the end of each half-rotation, whereby the clamping members may be either brought together, or separated.

2. A hide and leather working machine comprising a frame and mounted thereon, in combination: a rotary bladed drum; spring-cushioned rocker arms pivoted to the frame; swinging arms pivoted to the frame; a shaft journaled in the frame parallel to the axis of the drum; cams disposed on said shaft and operatively engaging said rocker arms; cranks disposed on said shaft; links connecting said cranks with said swinging arms; co-acting clamping bars disposed in front of the drum and parallel to the axis thereof, the upper clamping bar being mounted on said rocker arms and the lower clamping bar being mounted on said swinging arms; rearwardly disposed levers pivoted to the frame; links yieldingly connecting said levers with said rocker arms; a rearwardly disposed bar mounted on said levers parallel to the axis of the drum; a flexible hide and leather support attached at its upper end to said lower clamping bar and at its lower end to said rearwardly disposed bar; means for rotating the drum; means for rotating the shaft carrying said cams and cranks; and means for automatically stopping said last mentioned shaft at the end of each half-rotation, whereby the clamping members may be either brought together, or separated.

3. In a hide and leather working machine of the character described, in combination: a rotary drum; means for rotating said drum; clamping bars horizontally disposed in front of the drum and parallel to the axis thereof; means for bringing the clamping bars together and separating them; and a safety rail disposed between the clamping bars; together with means for automatically swinging said rail outwardly, as the bars come together, and inwardly as the bars separate.

4. In a hide and leather working machine of the character described, in combination: a rotary bladed drum of sufficient diameter and breadth to workably and simultaneously engage more than one-half the hide or skin to be operated on; a flexible hide or skin support of a correspondingly effective area; with means for rotating the drum and means for alternately carrying the flexible support into contact with the drum and out of such contact.

5. In a hide and leather working machine of the character described, in combination: a rotary bladed drum of sufficient diameter and breadth to workably and simultaneously engage more than one-half the hide or skin to be operated on; a flexible hide or skin support of a correspondingly effective area; with means for rotating the drum and spring-cushioned means for alternately carrying the flexible support into contact with the drum and out of such contact.

6. In a hide and leather working machine of the character described, in combination: a rotary bladed drum; co-acting clamping bars; and a flexible hide support; with means for rotating the drum and operator-controlled means for automatically and successively bringing the clamping bars into co-engagement and the flexible hide support into contact with the drum.

7. In a hide and leather working machine of the character described, in combination: a bladed rotary drum and a flexible hide support, the co-operative surfaces of the drum and support being of sufficient area to simultaneously and continuously workably engage more than one-half a hide; with means for rotating the drum and means for carrying the support into and out of contact therewith.

JOHN A. WHEELER, Jr.
ROBERT F. WHITNEY.